United States Patent [19]  
Kintner

[11] 4,032,108  
[45] June 28, 1977

[54] BUTTERFLY VALVE ASSEMBLY
[76] Inventor: Edwin K. Kintner, McNaugher Heights, P.O. Box A-RD No. 4, Johnstown, Pa. 15905
[22] Filed: Sept. 17, 1975
[21] Appl. No.: 614,312
[52] U.S. Cl. .................................. 251/306; 251/308
[51] Int. Cl.² ............................................ F16K 1/22
[58] Field of Search .................. 251/305, 306, 308; 137/584, 527, 527.2

[56] References Cited
UNITED STATES PATENTS

| 399,390 | 3/1889 | Eareckson | 137/527 |
|---|---|---|---|
| 813,771 | 2/1906 | Bush | 251/306 |
| 1,168,332 | 1/1916 | Riley | 137/584 |
| 1,188,462 | 6/1916 | McCormack | 251/306 |
| 2,883,149 | 4/1959 | Fiorentini | 251/306 |
| 3,030,069 | 4/1962 | Cummins | 251/308 |
| 3,620,242 | 11/1971 | Pease | 251/306 |
| 3,893,469 | 7/1975 | Baker | 137/584 |

FOREIGN PATENTS OR APPLICATIONS

| 1,150,573 | 5/1956 | France | 251/308 |
|---|---|---|---|
| 994,490 | 7/1949 | France | 251/306 |
| 362,690 | 4/1921 | Germany | 251/306 |
| 656,748 | 11/1933 | Germany | 251/308 |
| 881,436 | 11/1961 | United Kingdom | 251/305 |
| 1,100,545 | 1/1968 | United Kingdom | 251/306 |

Primary Examiner—William R. Cline  
Assistant Examiner—H. Jay Spiegel  
Attorney, Agent, or Firm—William J. Ruano

[57] ABSTRACT

A butterfly valve assembly particularly suitable for large size fluid-carrying pipes. Instead of using a unitary disc as the rotatable valve element, two offset half discs are provided, staggered by the diameter of a pipe or sleeve surrounding and connected to the shaft which is rotated to open and close the valve. Sealing half-rings connected to each half disc and projecting beyond their perimeters abut against a radially inwardly extending shoulder on an interconnecting pipe or housing between two confronting large pipe ends. Thus no rubbing of the sealing parts results and a positive seal is provided. Means are provided for access to the butterfly disc assembly for replacing the sealing half rings without taking the entire assembly from the line.

1 Claim, 4 Drawing Figures

BUTTERFLY VALVE ASSEMBLY

This invention relates to improvements in a butterfly valve, particularly those used in fluid carrying pipes of large size.

An outstanding disadvantage of commonly used butterfly valves in fluid carrying pipes of relatively large size and having double rubber seats is that the disc rubs against and compresses one side of the rubber seat in order to get into a seating or sealing position, which causes wear on one side of the seat, thus shortening the life of the valve.

Another disadvantage of commonly used large butterfly valves is that replacement of the seal usually necessitates removal of the valve from the line which involves interruption of operation of the system, that is, down time, as well as considerable effort and expense for replacement of the valve seal.

An object of the present invention is to provide a novel butterfly valve which is devoid of the above-named disadvantages and which will provide a very positive and tight seal without the necessity of the disc rubbing against the rubber seat, therefore having considerably longer life, as well as providing a more reliable seal.

Another object of the present invention is to provide a butterfly valve assembly which enables the seal to be replaced without the necessity of removing the valve from the line, thus minimizing down time and labor costs. Other objects and advantages will become more apparent from a study of the following description, taken with the accompanying drawings wherein.

Figure 1:
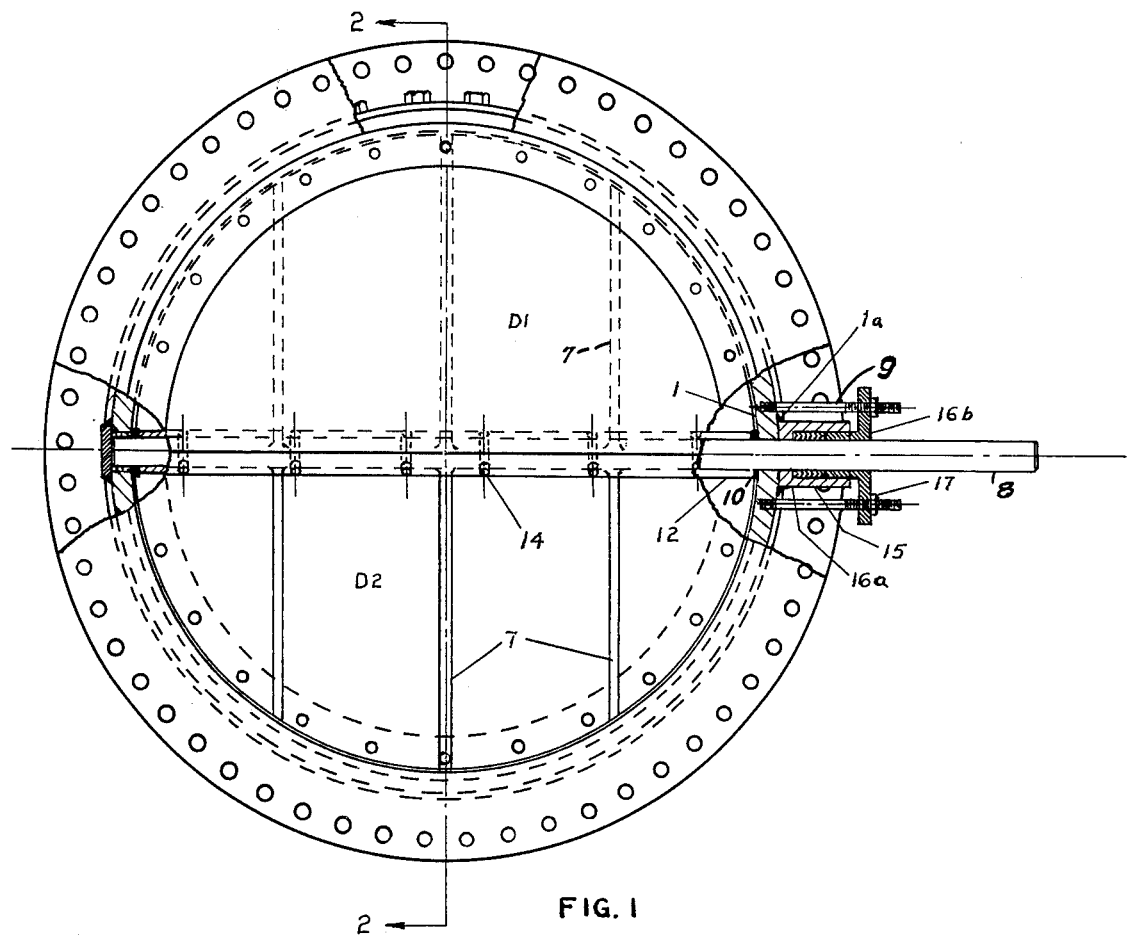
FIG. 1 is an elevational view of a pipe interconnection assembly including a butterfly valve embodying the principles of the present invention.
Figure 2:
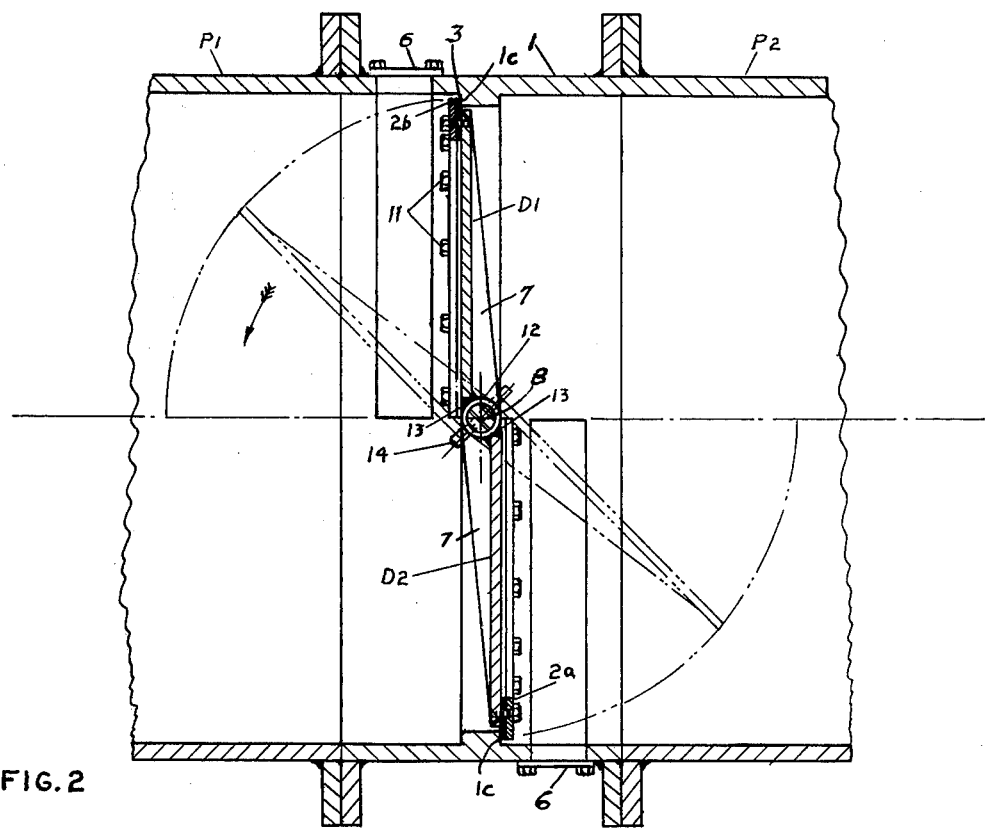
FIG. 2 is a cross-sectional view taken along line 2—2 of FIG. 1.

Referring more particularly to FIGS. 1 and 2 of the drawing, letters P1 and P2 show ends of confronting pipes, each having a flange with a plurality of circularly spaced holes through which bolts may be inserted for coupling the pipes to the corresponding flanges of an interconnecting pipe segment or housing 1.

D1 and D2 show half discs, preferably of metal, such as stainless steel, and of a diameter slightly less than the internal diameter of the integral shoulder or ring 1c of the housing 1. The diameters of half rings D1 and D2 are welded at 13, 13, or otherwise integrally secured to the pipe or sleeve 12, whereby the peripheries of the half rings are staggered in the longitudinal direction of pipes P1 and P2, the staggering being substantially to the extent of the diameter of the pipe or sleeve 12. Preferably, the half rings D1 and D2 are reinforced by a plurality of integral fins 7 spaced along the pipe 12. Pipe or sleeve 12 is rigidly connected to a shaft 8 by means of a plurality of dowel pins 14 which are disposed substantially 90° from the welded joints 13, 13. Thus as the shaft 8 is turned about its axis to the dot and dash position, it will carry with it the sleeve or pipe 12 as well as the half discs D1 and D2.

Half rings 2a and 2b which have a larger diameter than the half discs D1 and D2 sandwich half sealing rings 3 between them and the half discs D1 and D2 by means of bolts 11 or other suitable fastening means. Thus the outer perimetrical portions of the sealing half rings 3 are abutted against the end surfaces of the rings or shoulders 1c to provide reliable seals. It will be noted that there is no lateral rubbing of the half sealing rings 3 against the shoulders 1c, but merely a positive contact — thereby giving high reliability and very long life to the seal.

It will also be noted that the half sealing rings 3 and the diametrically opposite half rings D1 and D2 are staggered in a longitudinal direction of pipes P1 and P2 by substantially the diameter of the sleeve or pipe 12.

Another important feature of the invention is the provision of semi-circular cover plates 6, 6, attached by bolts or other detachable fastening means to opposite sides of the housing 1 to cover semi-circular openings formed therein. By removing the cover plates 6, 6, it is possible to gain access to the valve through the openings covered by cover plates and replace the sealing half rings, thereby preventing the necessity of removing the housing 1 and valve assembly, which is a much greater tedious and time consuming task.

As shown in FIG. 1, sealing means for the shaft 8 are provided by bolts 9 screw threaded into housing 1 so that sealing material 15 which is provided in the well portion of telescoped sleeves 16a, 16b, is compressed by tightening up on the bolts 17. A sealing ring 10 is also provided between pipe or sleeve 12 and the housing 1.

Figure 3:
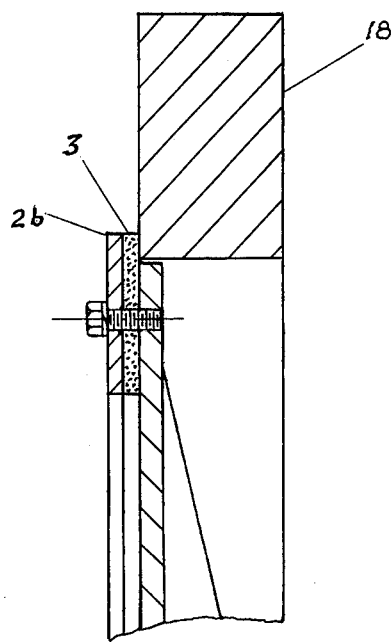
FIG. 3 is a fragmentary, cross-sectional view of a modification of the interconnection between pipes shown in FIG. 2; and, FIG. 4 is a fragmentary, cross-sectional view of a modified type of seal which may be used with the construction shown in FIG. 3.

FIG. 3 shows a modification of the housing portion, comprising a ring 18, of much smaller thickness than the housing 1, which will take the place of the housing 1 and by the use of annular shims may be removably bolted between the flanges of pipes P1 and P2 shown in FIG. 2.

Figure 4:
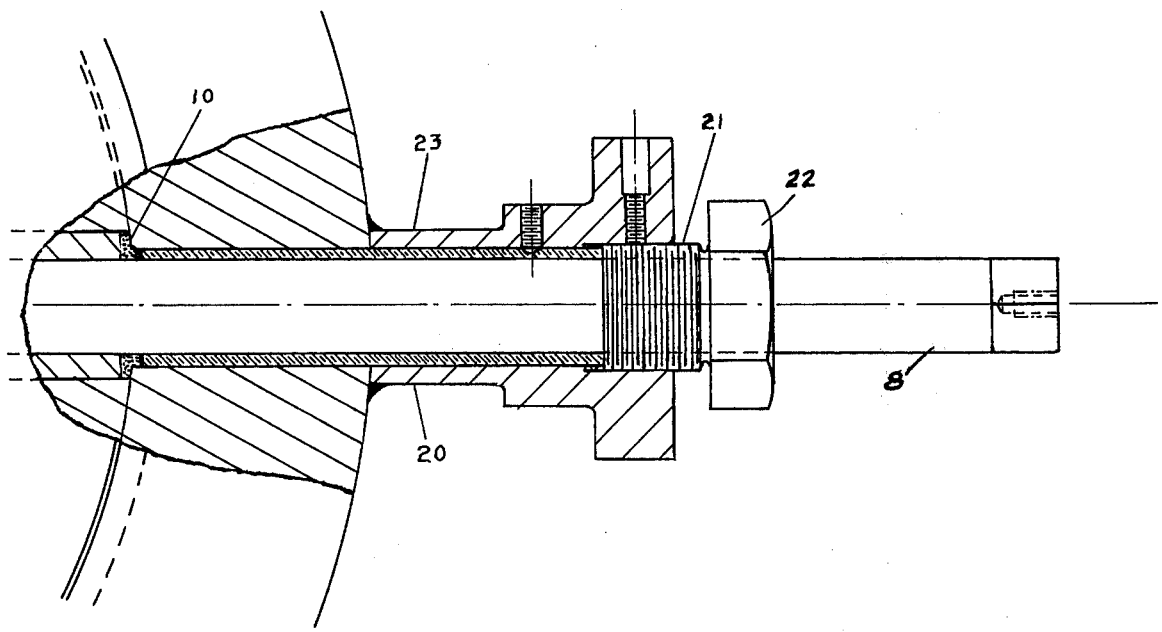

FIG. 4 shows a modification of the sealing ring shown in FIG. 1 and comprises a sleeve 20 terminating in an integral threaded portion 21, whereby turning of the nut 22, integral therewith, will propel radially, by the screw threaded action with the integral collar 23, to provide greater pressure on the sealing ring 10.

Thus it will be seen that I have provided a novel butterfly valve construction which is especially useful in pipes of large size for conducting fluids, such as water, and in which no friction is provided between the sealing ring and the metallic sealing ring portion rigidly connected to the pipes, thereby greatly increasing the life of the butterfly valve seal as well as the reliability or effectiveness of the seal, particularly when high pressure of liquid flow are encountered; also I have provided cover plates to enable access to the butterfly valve while in the line without the necessity of removing it and the supporting housing, thereby minimizing down time and labor expense for replacing the valve seal. Of course, the valve itself may also be removed.

While I have illustrated and described several embodiments of my invention, it will be understood that these are by way of illustration only and that various changes and modifications may be contemplated in my invention and within the scope of the following claims.

I claim:

1. In combination with spaced pipe ends of a fluid carrying line, a cylindrical housing bridging said pipe ends and interconnecting them and including metallic seats formed on the sides of a radially inwardly extending collar portion thereof, a butterfly type valve comprising a rotatably shaft, a sleeve surrounding and connected to said shaft, a pair of half disc of slightly smaller diameter than the inner diameter of said collar portion and integrally secured to diametrically opposite sides of said sleeve, said half discs being provided with integral fins disposed in parallel spaced relationship along said sleeve, extending from said sleeve to adjacent the perimeters of said half discs, and sealing half rings of greater diameter than said inner diameter and detachably connected to and projecting beyond the periphery of said half discs so as to form seals with said sides of said collar portion and a pair of arcuate cover plates, one upstream of said collar portion and the other downstream of said collar portion, each cover plate covering an arcuate hole of about 180° in said housing on substantially diametrically opposite sides of said butterfly valve to enable access thereto for replacing said sealing half rings.

\* \* \* \* \*